United States Patent [19]

Tels et al.

[11] 4,191,728

[45] Mar. 4, 1980

[54] PROCESS FOR SELECTIVE EXTRACTION OF METAL IONS FROM AQUEOUS SOLUTIONS AND EXTRACTING AGENTS SUITABLE FOR THAT PURPOSE

[75] Inventors: Martinus Tels; Jan P. Lotens; Hendrikus P. M. Kivits, all of Eindhoven, Netherlands

[73] Assignee: Stamicarbon, B.V., Geleen, Netherlands

[21] Appl. No.: 907,704

[22] Filed: May 9, 1978

Related U.S. Application Data

[63] Continuation-in-part of Ser. No. 883,668, Mar. 6, 1978, abandoned.

[30] Foreign Application Priority Data

Mar. 9, 1977 [NL] Netherlands ......................... 7702517

[51] Int. Cl.² .................. C01G 3/00; C01G 51/00; C01G 53/00; C01G 9/00
[52] U.S. Cl. .................................. 423/24; 423/100; 423/139; 423/54; 423/55
[58] Field of Search ........... 423/24, 100, 139, DIG. 1, 423/36, 42, 146

[56] References Cited

U.S. PATENT DOCUMENTS

| | | | |
|---|---|---|---|
| 3,558,288 | 1/1971 | Burrows | 423/24 |
| 3,666,446 | 5/1972 | Cook et al. | 423/100 |
| 3,703,573 | 11/1972 | Blytas | 423/24 |

OTHER PUBLICATIONS

Flett et al., "Extraction of Metals by Carboxylic Acids" in *Ion Exchange and Solvent Extraction*, vol. 3, Marinsky et al., Editors, Marcel Dekker, NY (1973), pp. 1–5, 14–20, 28–30, 36–40.

Pilpel, N., "Properties of Organic Solutions of Heavy Metal Soaps" in *Chemical Reviews* 63 (1963), pp. 221–234.

Stecher (Editor), *The Merck Index*, Merck & Co., Rahway, N. J. (1968), Eighth Edition, p. 763, "Oleic Acid".

Spitzer, E., "The Use of Organic Chemicals for the Selective Liquid/Liquid Extraction of Metals,", *Ingenientsblad*, vol. 41, Nos. 15–16, pp. 418–423 (1972).

*Primary Examiner*—Herbert T. Carter
*Attorney, Agent, or Firm*—Cushman, Darby & Cushman

[57] ABSTRACT

An extraction process is described for the selective separation of bivalent metal ions belonging to the group Cu, Co, Ni and Zn in aqueous solution of Cu- and Ni-ions, Cu- and Zn-ions or Cu- and Co-ions, wherein there is used as the extraction medium one or more unsaturated fatty acids, optionally in solution and/or in admixture with saturated fatty acids and an aliphatic oxime.

6 Claims, 3 Drawing Figures

PROCESS FOR SELECTIVE EXTRACTION OF METAL IONS FROM AQUEOUS SOLUTIONS AND EXTRACTING AGENTS SUITABLE FOR THAT PURPOSE

CROSS-REFERENCE TO RELATED APPLICATIONS

This application is a continuation-in-part of our earlier application, Ser. No. 883,668 filed Mar. 6, 1978, and now abandoned.

This invention relates to a process for selective extraction of bivalent metal ions of the Groups of Cu, Co, Ni, and Zn, from an aqueous solution of Cu- and Co-ions, Cu- and Ni-ions or Cu- and Zn-ions, wherein there is employed an organic extraction medium.

BACKGROUND OF THE INVENTION

Processes of this kind are employed on a large scale in the recovery of metals from ores. After the metals are brought into an aqueous solution, the required metal ions are then extracted from such solution. In addition, this process is also employed for the recovery of metals from waste steams originating, for instance, from the electroplating industry, catalyst processing and the like.

Various materials have been used as organic extracting agents, such as thiobenzoylmethane dissolved in benzene or chloroform, together with a pyridine derivative, for extraction of nickel. (See J. Inorg. Nucl. Chem. 31 (1969) p. 2612). For extraction of copper, nickel and cobalt, pyrophthalone or 5-nitropyrophthalone may be used (Russian Journal of Inorganic Chemistry, 18 (1973) no. 8). In addition, a great number of other extracting agents are known which are based on α- or β-hydroxyoxime compounds. One characteristic of these various extracting agents is that their use is, in most cases, expensive while a number of them exhibit undesirable, toxic properties. A general review of metal-extraction is given in Chemical Engineering, Aug. 30, 1976, pp. 86-94.

The purpose of the present invention is to provide a less expensive extracting agent which is simple to employ and which is also relatively non-toxic.

This invention has been developed through the work of the above named inventors with the technical assistance of the Technical University at Eindhoven.

DESCRIPTION OF THE INVENTION

Surprisingly, it has now been found that it is possible for said metal ions to be extracted selectively from an aqueous solution thereof if the extraction takes place using an extracting agent based on oleic acid or on a mixture of oleic acid with other unsaturated fatty acids. Most preferably there is used a mixture consisting of at least 50% of oleic acid, the balance being essentially, for instance, linoleic- and/or linolenic acid. In addition to said components, the mixture may also contain some amounts of saturated fatty acids. This is, notably, the case with technical grade oleic acid.

In a special embodiment of the invention a quantity of a (cyclo)aliphatic oxime, of from 6 to 12 carbon atoms, preferably cyclohexanone oxime, is added to the extraction agent mentioned above. In such embodiment, the weight ration of the fatty acid to oxime preferably lies between ½ and 50.

Addition of an oxime to the extracting agent affects the 'distribution coefficients'. By 'distribution coefficient' ('m', hereafter), there is meant the ratio concentration of a given metal ions in the organic phase to the concentration thereof in the aqueous phase after the extraction system has essentially reached equilibrium.

The presence of the oxime component has a positive influence on the selectivity on kinetics of the system, while also improving the separation of the organic and the aqueous phases after the extraction, especially in the case of Cu-Ni.

Furthermore in the case of extraction from acidic solutions, the loading of the organic phase is increased, so that the number of extraction steps, or the amount of extractant can be reduced.

For extraction of metal ions from aqueous solutions, a pH is used which is preferably in the range between 4 and 9. Notably, both Cu-ions and Ni-ions, transfer into the organic phase to a considerable extent at pH values of between 6 and 9, while at a pH value of between 4 and 6.0 mainly only Cu-ions transfer into the organic phase. In a strongly acid medium, i.e., at pH values of less than about 2, all metal ions will again transfer into the aqueous phase, so that the organic medium may thereby by virtually freed from metal ions. This circumstance may be utilized in the practical realization of the present process.

The value of the pH for the extraction is not critical as such, and is essentially dependent upon and chosen according to the particular extracting agents used and depending upon the particular metal ions to be extracted from the aqueous solution. The extract required pH value for optimum results may in any case be established by means of simple trial tests using the selected extractant. It is advisable, however, that in any event the pH value chosen be less than about 8, due to possible reactions of the fatty acid.

The adjustment of the pH can be done with an acid or a base.

Preference is given to sulfuric acid as other strong acids have a tendency to react chemically with the extraction agent. As a base $NH_4OH$ is preferred as due to the occurrence of the $Cu-NH_3$-complex a higher pH-value, combined with a higher amount of dissolved Cu can be obtained, resulting in a better extraction.

In general, the temperature at which the extraction is carried out will be room temperature, but this may vary according to the temperature at which the various liquids are available. The minimum temperature value is generally governed by the viscosity of the organic medium, which, of course, may not be too high. On the other hand, the temperature should not be so high that one or more of the components will evaporate to a high degree. Of course, the choice of the temperature also exerts an influence on the kinetics of the extraction and on the ease and completeness of separation of the organic and aqueous phases after the extraction.

The invention also relates to the extracting agents used in this process. The extracting agents may be employed both as such or in a solution. If a solution is used, the usual, mainly non-polar, aliphatic solvents may then be used, as as kerosene, hexane, isobutane, perchloroethene, or special solvents developed for extracting agents. It is also possible to employ slightly polar solvents, such as methylisobutylketone and the like, without having an adverse effect on the extraction, however, the solvent used should in any event be preferably substantially insoluble in the aqueous phase.

The preferred extraction agent consists, per liter, of 5-40 g of cyclohexanone oxime, 20-250 g of a fatty acid mixture mainly consisting of oleic acid, made up with a mainly non-polar solvent. The weight ratio of fatty acid to oxime may lie between about 0.5 and 50.

These values relate to extracting agents wherein the oxime is present in a sufficient quantity so that a distinct effect of the added oxime on the selectivity of the extraction is observable. It is possible, however, that the organic/aqueous phase separation, after the extraction, is less than satisfactory with certain compositions of extracting agents based only on fatty acids. In such a case, the phase separation may be appreciably improved by the addition of a very slight quantity of oxime to the fatty acid. In this case fatty acid/oxime weight ratios of the order of about 50 up to about 500, or even higher, may be used.

The advantage of the use of the extracting agents according to the present invention is especially experienced in the fact that simple, relatively inexpensive, chemical compounds are used. In general, these are also less toxic than the commonly used extracting agents. In addition, a notably higher rate for the nickel-ion extraction is observed, in contrast to the generally, low rates realized with previously known extraction agents.

The process and extracting agents used according to this invention are especially highly suitable for selective extraction of copper and nickel ions from aqueous solutions which also contain chromium and zinc ions.

The invention will now be illustrated with the aid of accompanying drawings, which show:

The invention is, of course, not limited to these embodiments.

Figure 1:
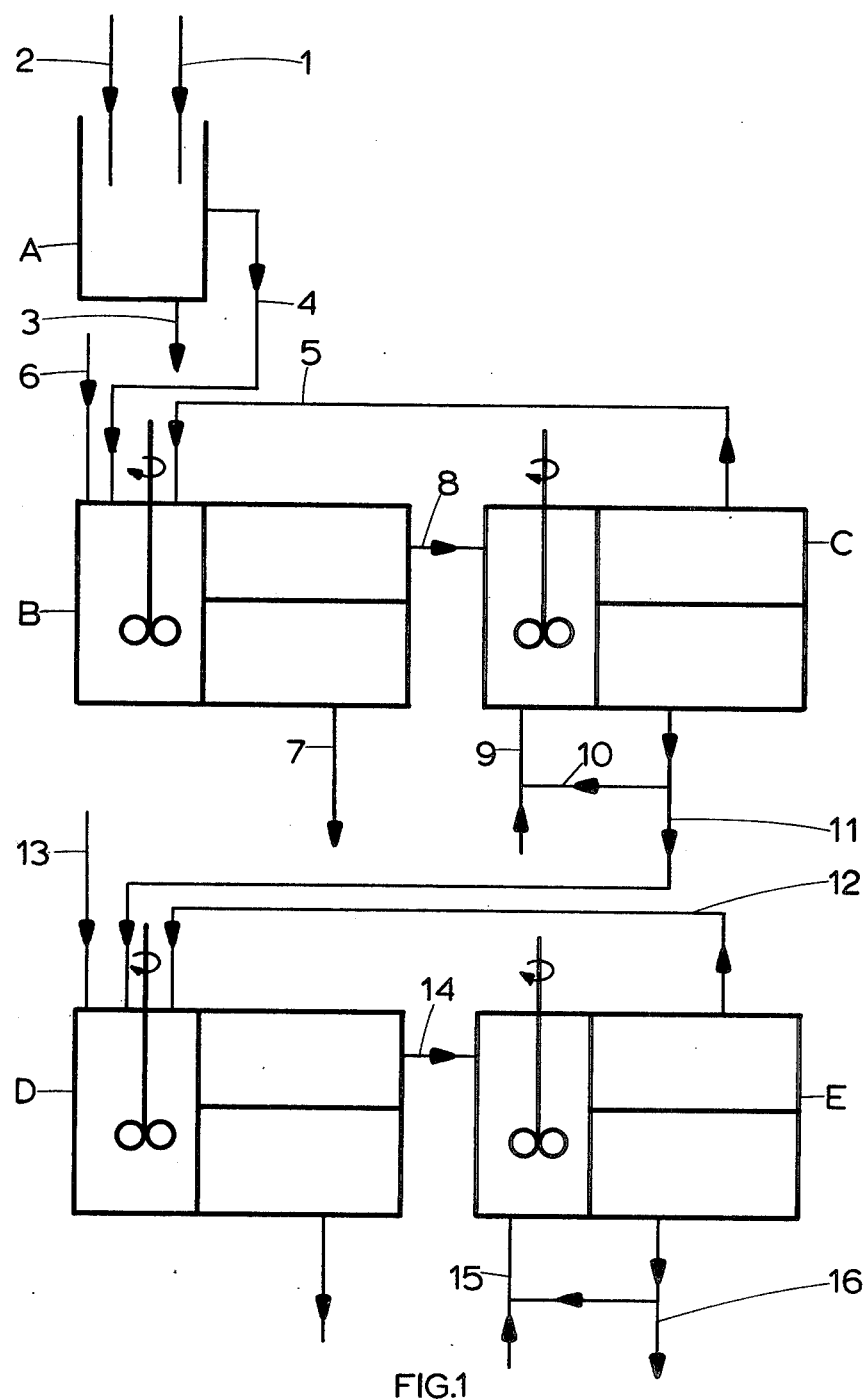
In FIG. 1, an embodiment of the process according to the invention for separation of Fe-, Ni-, Cr-, Zn-, and Cu-ions originating, for instance, from the electroplating industry, with the aid of fatty acids and oxime.
Figure 3:
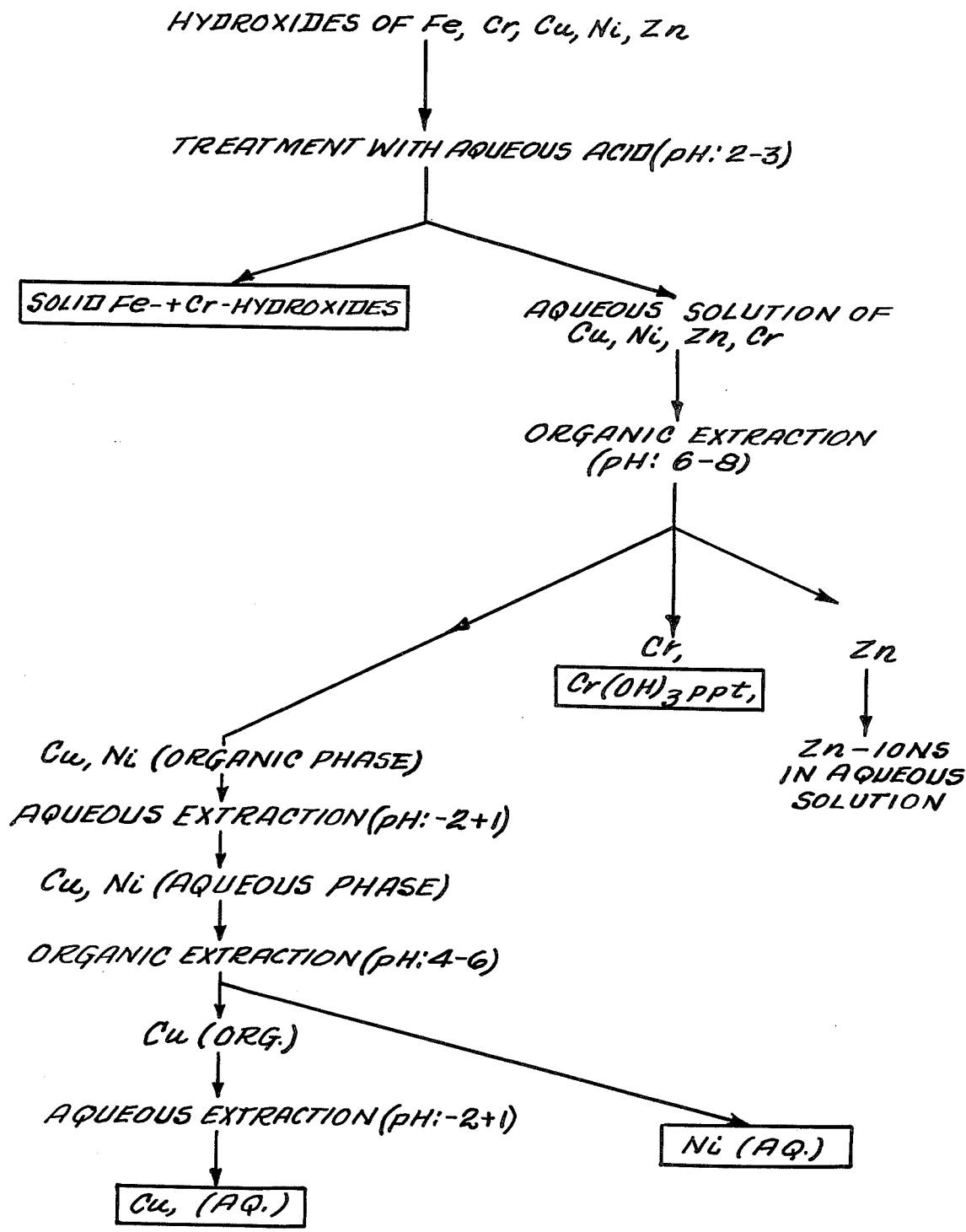
FIG. 3 is a flow diagram starting with a mixture of the solid metal hydroxides.

With reference to FIG. 1, a process for separating Fe, Cu, Ni, Zn and Cr can be described. Briefly, this process can be illustrated by the diagram of FIG. 3, wherein, at the start, a mixture of solid hydroxides of said metals has been formed.

FIG. 1 schematically represents an installation mainly consisting of a dissolving vessel A and four mixer-settler units B, C, D and E. A description of a mixer-settler unit of this kind is given in Chemical Engineering, Jan. 19, 1976, at pp 99 and 97, the disclosure of which is incorporated herein by reference. Besides such mixer-settler units it is also possible to use other equipment suitable for extraction, like a pulsation column. A description of such a pulsation column is given in the Dutch Patent Specification 123,177.

The pulsation column is a device for pulsating a liquid with a diaphragm capable of being reciprocated by means of a fluid, the device having, on one side of the diaphragm, a slide valve for controlling the supply and discharge of the fluid. This valve is connected to the diaphragm and is capable of moving in a cylinder mounted on the diaphragm housing. Pulsation columns are often used for treating liquids by pulsating the liquids in the column so that, in addition to their normal movement through the column, the liquid makes an up-and-down movement.

Via line 1 a quantity of solid material mainly consisting of a mixture of hydroxides of Fe, Cr, Zn, Ni, and Cu is passed to vessel A. Via line 2 such a quantity of acid is added, for instance sulphuric acid, that the aqueous pH is adjusted to a value of between 2 and 3, as a result of which Cu-, Ni- and Zn-ions are dissolved, together with part of the Cr-ions. Via drain 3 the remaining solid, principally consisting of iron hydroxides, is discharged for further processing. The acid solution thus formed, containing the Cu-, Zn-, Cr-, and Ni-ions, is then passed to the mixer part of the vessel B via line 4. Via line 5 an organic extractant liquid, originating from unit C, is supplied, essentially consisting of a hexane solution (11 wt.-% of solutes) of cyclohexanone oxime (1 parts) and a mixture of fatty acids (10 parts). The fatty acid used is commonly commercially available as "technical-grade oleic acid". An amount of caustic is supplied via line 6 such that the pH is now adjusted to a value between 5.5 and 8. As a result the Cu- and Ni-ions are substantially extracted into the organic phase. The Zn- and Cr-ions remain in the aqueous phase and removed via line 7; however, Cr(III)-hydroxide precipitates owing to its very small solubility product being exceeded. Cr- and Zn-ions may then be separated from each other by subsequent processing, e.g., centrifuge or filtration.

Next, the separated organic phase is passed from unit B to the mixer part of unit C via line 8. An amount of acid is supplied via line 9 such that the pH is now adjusted to between a value of $-2$ and $+1$, as a result of which both the Cu-ions and the Ni-ions transfer into the aqueous phase. A large portion of this aqueous phase is recycled via line 10 from the settler part of C to the mixer part. This has the advantage that Cu- and Ni-sulphate now become crystallized. The crystals thus formed may be separated off, continuously or discontinuously, and supplied, via line 11, to mixer-settler D. In this way, an extra purification step is included in the process, for the crystallization step minimizes the presence of impurities, such as Fe-ions, which may possibly have also been extracted, and which may have a disturbing effect on a subsequent stage of the process, or even contaminate the desired end-products. Also, since the aqueous phase need not then be neutralized in the unit D, the consumption of caustic therein is limited to a minimum amount.

Via line 12, an organic extracting agent is supplied, to unit D, originating from unit E, and which consists mainly of a solution (10 wt.-%) of the same aforementioned mixture of fatty acids, dissolved in hexane. In order to achieve proper separation of the two phases it may be necessary to add some oxime to the fatty acid mixture. A quantity of caustic is added via line 13 such that the pH value of the solution is adjusted to between 4 and 5.5. As a result of this change in the pH, the Cu-ions are now substantially extracted into the organic phase in unit D. The remaining aqueous phase then contains only Ni-ions, which phase and ions can be removed as an aqueous solution from unit D and separated off in a known way.

Via line 14 the organic phase from unit D is passed to the mixer part of unit E, to which an amount of acid and a part of the aqueous phase from the settler part of unit E are supplied via line 35. Due to the liquid now becoming strongly acid (i.e., a pH of $-2$ to $+1$), the Cu-ions transfer back to the aqueous phase. The organic phase, which is now substantially free of metal ions, is then recycled to unit D, while the aqueous phase is discharged via line 16 to recover the Cu-ions therefrom, if desired after crystallization of CuSO₄ by recirculation of the aqueous phase.

Figure 2:
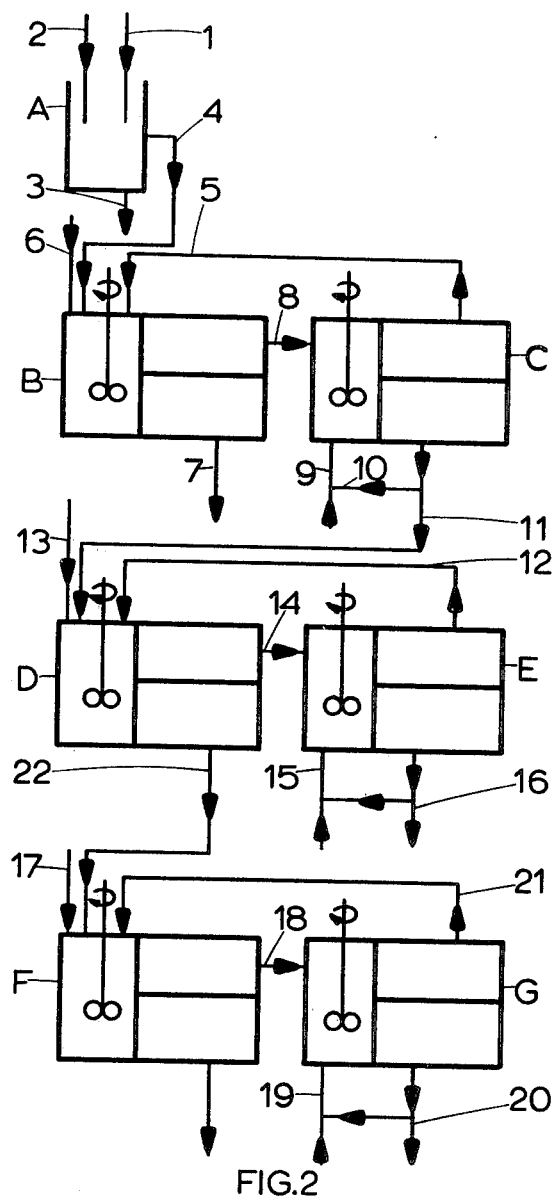
In FIG. 2, a principally identical embodiment, in which an additional concentration and purification step for Ni-ions has been installed.

In FIG. 2, the same process is described as in FIG. 1, in which the various symbols have the same meaning as in FIG. 1. Now, however, two additional mixer-settler units F and G have been added.

The solution of Ni-ions originating from unit D is supplied via line 22 to unit F, together with an organic phase originating from unit G, mainly consisting of the above-mentioned fatty acids mixture and cyclohexanone oxime, dissolved in hexane. Via line 17, caustic is added to unit F, so that the pH of the solution is adjusted to a value between 5.5 and 8. As a result, the Ni-ions are taken up by the organic phase, whereupon this organic phase is supplied to unit G via line 18. Via line 19, an amount of acid is added to this unit such that the pH is adjusted to a value between −2 and +1. In this way, the organic phase is now substantially freed from Ni-ions. The organic phase is recycled to unit F via line 21. Part of the aqueous phase is then sent back from the settler part to the mixer part in unit G, so that the concentration of Ni-ions in unit G increases. If the solublity of the Ni-ions is exceeded, and precipitates, it will then be possible to discharge crystals via line 20.

In the embodiments of the process according to the invention described above, it has been assumed that no loss of organic medium occurs. In practice, a small portion of the organic medium will invariably become dissolved in the aqueous phase, so that make-up of the organic medium is necessary.

The invention is further illustrated with the aid of the following test examples, but is, of course, not limited thereto. In these tests, the distribution coefficient for the given metal ion, and the specified extraction agent, is measured at varying pH's, and the data numerically demonstrate the extraction procedures of this invention.

EXAMPLES OF THE INVENTION

Example 1

Cu-ions in an aqueous solution, concentration of 4.9 g/l, have been extracted with the aid of an extracting agent of varying compositions at different pH values. The phase volume ratio was 1:1.

In Table 1 below the distribution coefficient (m) of the Cu-ions is given as a function of the pH value. The extracting agent used was 10 ml of oleic acid mixture, as described above, and 90 ml of methylisobutylketone, in which 1 g of cyclohexanone oxime is dissolved.

TABLE 1

| Test No. | pH | m |
|---|---|---|
| 1 | 3.7 | 1.8 |
| 2 | 4.0 | 3.0 |
| 3 | 4.2 | 3.9 |
| 4 | 6.3 | 118.3 |
| 5 | 7 | 119 |

This Table illustrates the ability to adjust the extraction of copper into the organic phase by adjustment of the pH.

In the next tests, in which Cu-ions have been extracted from an aqueous solution having the same concentration, the distribution coefficients have been determined for three different extracting agents in the same phase ratio as in the tests 1 to 5 incl.

A = 25 ml of oleic acid, 75 ml of kerosene, 1 g of cyclohexanone oxime.

B = 25 ml of oleic acid, 75 ml of kerosene.

TABLE 2

| Test No. | pH | A | B |
|---|---|---|---|
| 6 | 3.7 | 0.1 | 0.1 |
| 7 | 4 | 1 | 0.4 |
| 8 | 7 | 20 | 39 |

Table 2 illustrates the effect of the oxime as favoring the extraction of copper into the organic phase particularly at a pH of 7.

The extraction of Ni-ions in a concentration of 5.0 g/l is clearly illustrated with the aid of the followng tests. The extraction agent was used in a phase ratio of 1:1, and was composed of 90 ml of hexane with 10 ml of oleic acid.

TABLE 3

| Test No. | pH | m |
|---|---|---|
| 9 | 3.9 | 0 |
| 10 | 6.5 | 3.5 |
| 11 | 8 | 8 |

It will be seen from the data in Tables 1, 2 and 3 that by adjustment of the pH, the relative distribution coefficients for Ni and Cu may be so altered as to permit an extraction separation thereof.

All the tests of this example were performed with metal ions of one kind only. With mixed solutions about the same values of the distribution coefficients were obtained.

EXAMPLE 2

A watery solution containing 10,6 gr/l bivalent Cu and 1,6 g/l bivalent Co was extracted with the aid of an extraction agent containing 10% by weight of oleic acid, technical grade, 1% by weight of cyclohexanonoxime and 89% by weight of kerosene. The phase volume ratio was 1:1.

In the table below the distribution coefficients (m) of Cu and Co are given at different pH-values.

| Test No. | pH | $m_{Cu}$ | $m_{Co}$ |
|---|---|---|---|
| 12 | 4.6 | 2.24 | 0.024 |
| 13 | 5.7 | 17.3 | 0.03 |
| 14 | 6.6 | 114.14 | 0.07 |

EXAMPLE 3

A watery solution, containing 4.6 g/l bivalent Cu and 2.79 g/l bivalent Zn was extracted with an extraction agent containing 10% by weight of oleic acid (technical grade) and 90% by weight of kerosene. The phase volume ratio was 1:1. The results were as follows.

| Test No. | pH | $m_{Cu}$ | $m_{Zn}$ |
|---|---|---|---|
| 15 | 5.6 | 171 | 0.8 |

EXAMPLE 4

A watery solution containing 10 g/l bivalent Cu and 5 g/l bivalent Ni was extracted in the same manner as in example 2 (Test No. 16). Thereupon the same test was performed without the oxime in the extraction agent (Test No. 17).

The results are given below.

| Test No. | pH | $m_{Cu}$ | $m_{Ni}$ |
|---|---|---|---|
| 16 | 5.7 | 400 | 0.09 |
| 17 | 5.7 | 230 | 0.02 |

What is claimed is:

1. In a process for the selective extraction of copper and nickel ions from aqueous solution using a substantially immiscible organic extraction agent,
the improvement wherein said extraction agent is essentially composed of a mixture of (1) oleic acid, or (2) oleic acid and at least one other unsaturated fatty acid and a (cyclo) aliphatic oxime, of from 6 to 12 carbon atoms, and wherein the
   (1) copper and nickel ions are first extracted with said extraction agent at a pH value of between 6 and 9 from an aqueous solution into said organic extraction agent,
   (2) thereafter extracting the copper and nickel ions from said organic phase into a second aqueous phase at a pH of between −2 and +1, and thereafter,
   (3) at a pH of between 4.0 and 6.0, selectively extracting said copper ions from said second aqueous phase with an extraction agent essentially composed of a mixture of (1) oleic acid, or (2) oleic acid and at least one other unsaturated fatty acid and a (cyclo) aliphatic oxime, of from 6 to 12 carbon atoms, and then
   (4) the copper ions in the organic phase are again reabsorbed into a third aqueous phase at a pH of between −2 and +1.

2. The process according to claim 1, wherein said mixture contains at least 50% of oleic acid.

3. The process according to claim 1, wherein linoleic acid or linolenic acid is present in the extraction agent.

4. The process according to claim 1, wherein the oxime is cyclohexanone oxime.

5. The process according to claim 1, wherein the fatty acid/oxime weight ratio lies between about 0.5 and 500.

6. The process according to claim 5, wherein the fatty acid/oxime weight ratio lies between about 0.5 and 50.

* * * * *